(12) United States Patent
Yishay et al.

(10) Patent No.: US 11,212,302 B2
(45) Date of Patent: Dec. 28, 2021

(54) SYSTEM AND METHOD FOR MONITORING SECURITY OF A COMPUTER NETWORK

(71) Applicant: Verint Systems LTD., Herzliya Pituach (IL)

(72) Inventors: Yitshak Yishay, Revava (IL); Vadim Pogulievsky, Herzliya Pituach (IL)

(73) Assignee: VERINT SYSTEMS LTD., Pituach (IL)

( * ) Notice: Subject to any disclaimer, the term of this patent is extended or adjusted under 35 U.S.C. 154(b) by 322 days.

(21) Appl. No.: 15/392,367

(22) Filed: Dec. 28, 2016

(65) Prior Publication Data

US 2017/0195352 A1 Jul. 6, 2017

(30) Foreign Application Priority Data

Dec. 30, 2015 (IL) .......................................... 243418

(51) Int. Cl.
*H04L 29/06* (2006.01)
*H04L 29/12* (2006.01)

(52) U.S. Cl.
CPC ........ *H04L 63/1425* (2013.01); *H04L 63/145* (2013.01); *H04L 61/1511* (2013.01)

(58) Field of Classification Search
None
See application file for complete search history.

(56) References Cited

U.S. PATENT DOCUMENTS

| | | | |
|---|---|---|---|
| 8,402,543 B1 | 3/2013 | Ranjan et al. | |
| 8,533,842 B1 * | 9/2013 | Satish | H04L 63/20 726/22 |
| 8,682,812 B1 * | 3/2014 | Ranjan | H04L 63/1425 706/12 |
| 8,813,236 B1 * | 8/2014 | Saha | H04L 63/1408 726/25 |
| 8,826,426 B1 * | 9/2014 | Dubey | H04L 63/14 726/22 |

(Continued)

FOREIGN PATENT DOCUMENTS

CN 105024969 11/2015

OTHER PUBLICATIONS

Wang, W., et al., "Breaking Bad: Detecting malicious domains using word segmentation," Proceedings of the $9^{th}$ Workshop on Web 2.0 Security and Privacy (W2SP), 2015, 7 pages.
Bilge, Leyla, et al., "EXPOSURE: Finding Malicious Domains Using Passive DNS Analysis," 2014, 17 pages.
Dietrich, C.J., et al., "CoCoSport: Clustering and recognizing botnet command and control channels using traffic analysis," Computer Networks, vol. 57, 2013, pp. 475-486.

(Continued)

*Primary Examiner* — Arezoo Sherkat
(74) *Attorney, Agent, or Firm* — Isus Intellectual Property PLLC; Anthony Jason Mirabito

(57) ABSTRACT

Methods and systems to identify the domain names that can potentially be used for delivering instructions to a bot, before bots on a computer network succeed in obtaining the instructions. The system maintains a device rating for each device that reflects a likelihood that the device is infected by malware. The system also maintains a domain-name rating for each device that reflects a likelihood that the domain name is malicious. When a device attempts to access a particular domain name, the domain-name rating of the domain name is updated in light of the device rating of the device, and/or update the device rating of the device in light of the domain-name rating.

20 Claims, 2 Drawing Sheets

(56) References Cited

U.S. PATENT DOCUMENTS

| | | | |
|---|---|---|---|
| 9,363,282 B1* | 6/2016 | Yu | H04L 63/0218 |
| 9,424,414 B1* | 8/2016 | Demirjian | G06F 21/36 |
| 9,497,206 B2* | 11/2016 | Bernstein | H04L 63/1425 |
| 9,838,407 B1* | 12/2017 | Oprea | H04L 63/1416 |
| 2003/0097439 A1 | 5/2003 | Strayer et al. | |
| 2006/0230039 A1* | 10/2006 | Shull | H04L 63/08 |
| 2007/0121596 A1* | 5/2007 | Kurapati | H04L 29/06027 370/356 |
| 2008/0028463 A1 | 1/2008 | Dagon et al. | |
| 2008/0141376 A1 | 6/2008 | Clausen et al. | |
| 2010/0071065 A1 | 3/2010 | Khan et al. | |
| 2011/0099620 A1 | 4/2011 | Stavrou et al. | |
| 2011/0191849 A1* | 8/2011 | Jayaraman | H04L 63/1416 726/23 |
| 2011/0302656 A1* | 12/2011 | El-Moussa | H04L 63/1425 726/24 |
| 2012/0167221 A1 | 6/2012 | Kang et al. | |
| 2014/0215628 A1* | 7/2014 | Yan | H04L 63/1441 726/25 |
| 2015/0135326 A1 | 5/2015 | Bailey, Jr. | |
| 2015/0195299 A1* | 7/2015 | Zoldi | H04L 63/1408 726/25 |
| 2015/0220735 A1* | 8/2015 | Paithane | G06F 21/53 726/23 |
| 2015/0278729 A1* | 10/2015 | Hu | G06Q 10/0635 705/7.28 |
| 2017/0041333 A1* | 2/2017 | Mahjoub | H04L 61/1511 |
| 2018/0027006 A1* | 1/2018 | Zimmermann | H04L 63/0245 726/11 |

OTHER PUBLICATIONS

Eslahi, M., "botAnalytics: Improving HTTP-Based Botnet Detection by Using Network Behavior Analysis system," Dissertation, Faculty of Computer Science and Information Technology, University of Malaya, 2010, 124 pages.

European Search Report and Preliminary Opinion, dated Jan. 15, 2014, received in connection with corresponding European Application No. 13165912.

Gu, G., et al., "BotMiner: Clustering Analysis of Network Traffic for Protocol- and Structure-Independent Botnet Detection," USENIX Security Symposium, vol. 5, No. 2, XP61009228, 2008, 16 pages.

Gu, G., et al., "BotSniffer: Detecting Botnet Command and Control Channels in Network Traffic," Proceedings of the $15^{th}$ Annual Network and Distributed System Security Symposium (NDSS'08), San Diego, California, 2008, 18 pages.

Jacob, G., et al., "JACKSTRAWS: Picking Command and Control Connections from Bot Traffic," Proceedings of the $20^{th}$ Usenix Security Symposium, San Francisco, 2011, 16 pages.

Livadas, C., et al., "Using Machine Learning Techniques to Identify Botnet Traffic," In $2^{nd}$ IEEE LCN Workshop on Network Security (WoNS'2006), 2006, pp. 967-974.

Rieck, K., et al., "Botzilla: Detecting the 'Phoning Home' of Malicious Software," Proceedings of the ACM Symposium on Applied Computing (SAC), Sierre, Switzerland, 2010, 7 pages.

Wang, H., et al., "NetSpy: Automatic Generation of Spyware Signatures for NIDS," Proceedings of the $22^{nd}$ Annual Computer Security Applications Conference, Miami Beach, Florida, Dec. 2006, ten pages.

* cited by examiner

SYSTEM AND METHOD FOR MONITORING SECURITY OF A COMPUTER NETWORK

FIELD OF THE DISCLOSURE

The present disclosure relates to security monitoring of a computer network.

BACKGROUND OF THE DISCLOSURE

Wang et al., "Breaking Bad: Detecting malicious domains using word segmentation," IEEE Web 2.0 Security and Privacy Workshop, 2015, which is incorporated herein by reference, explores the feasibility of detecting malicious domains visited on a cellular network based solely on lexical characteristics of the domain names. In addition to using traditional quantitative features of domain names, the authors also use a word segmentation algorithm to segment the domain names into individual words to greatly expand the size of the feature set.

SUMMARY OF THE DISCLOSURE

There is provided, in accordance with some embodiments of the present invention, a method for monitoring security of a computer network. The method includes identifying one or more attempted accesses to respective Internet-resource identifiers by respective devices associated with the computer network, each of the Internet-resource identifiers having a respective Internet-resource-identifier rating that reflects a likelihood that the Internet-resource identifier is malicious, and each of the devices having a respective device rating that reflects a likelihood that the device is infected by malware. In response to the attempted accesses, (i) in response to one or more of the Internet-resource-identifier ratings, one or more of the device ratings are updated, and (ii) in response to one or more of the device ratings, one or more of the Internet-resource-identifier ratings are updated. Subsequently, in response to the device ratings and Internet-resource-identifier ratings, it is ascertained that the security of the computer network has been compromised, and an output is generated in response thereto.

In some embodiments, the Internet-resource identifiers include one or more domain names, each of the domain names having a respective domain-name rating that reflects a likelihood that the domain name is malicious.

In some embodiments, ascertaining that the security of the computer network has been compromised includes ascertaining that the security of the computer network has been compromised by ascertaining that (i) at least one of the Internet-resource identifiers is a malicious Internet-resource identifier, and (ii) at least one of the devices has attempted to access the malicious Internet-resource identifier.

In some embodiments, the output inhibits access from the computer network to the malicious Internet-resource identifier.

In some embodiments, ascertaining that the security of the computer network has been compromised includes ascertaining that at least one of the devices is infected by malware.

In some embodiments, the output reports the malware to anti-malware software.

In some embodiments, the method further includes updating one or more of the device ratings in response to one or more failed Domain Name System (DNS) queries originating from the devices to which the one or more device ratings, respectively, belong.

In some embodiments, updating the one or more of the Internet-resource-identifier ratings includes:
ascertaining that in a first one of the attempted accesses, a first one of the devices attempted to access a particular one of the Internet-resource identifiers, and
in response thereto, updating the Internet-resource-identifier rating of the particular one of the Internet-resource identifiers, and updating the one or more of the device ratings includes:
ascertaining that in a second one of the attempted accesses, a second one of the devices attempted to access the particular one of the Internet-resource identifiers, and
in response thereto, and in response to the updated Internet-resource-identifier rating of the particular one of the Internet-resource identifiers, updating the device rating of the second one of the devices.

In some embodiments, the second one of the attempted accesses is subsequent to the first one of the attempted accesses.

In some embodiments, the second one of the attempted accesses is prior to the first one of the attempted accesses.

In some embodiments,
updating the one or more of the device ratings includes:
ascertaining that in a first one of the attempted accesses, a particular one of the devices attempted to access a first one of the Internet-resource identifiers, and
in response thereto, updating the device rating of the particular one of the devices, and
updating the one or more of the Internet-resource-identifier ratings includes:
ascertaining that in a second one of the attempted accesses, the particular one of the devices attempted to access a second one of the Internet-resource identifiers, and
in response thereto, and in response to the updated device rating of the particular one of the devices, updating the Internet-resource-identifier rating of the second one of the Internet-resource identifiers.

There is further provided, in accordance with some embodiments of the present invention, apparatus for monitoring security of a computer network. The apparatus includes a network interface and a processor. The processor is configured to, via the network interface, identify one or more attempted accesses to respective Internet-resource identifiers by respective devices associated with the computer network, each of the Internet-resource identifiers having a respective Internet-resource-identifier rating that reflects a likelihood that the Internet-resource identifier is malicious, and each of the devices having a respective device rating that reflects a likelihood that the device is infected by malware. The processor is further configured to, in response to the attempted accesses, (i) in response to one or more of the Internet-resource-identifier ratings, update one or more of the device ratings, and (ii) in response to one or more of the device ratings, update one or more of the Internet-resource-identifier ratings. The processor is further configured to, subsequently, in response to the device ratings and Internet-resource-identifier ratings, ascertain that the security of the computer network has been compromised, and generate an output in response thereto.

There is further provided, in accordance with some embodiments of the present invention, a computer software product including a tangible non-transitory computer-readable medium in which program instructions are stored. The instructions, when read by a processor, cause the processor to identify one or more attempted accesses to respective Internet-resource identifiers by respective devices associated with a computer network, each of the Internet-resource identifiers having a respective Internet-resource-identifier rating that reflects a likelihood that the Internet-resource identifier is malicious, and each of the devices having a respective device rating that reflects a likelihood that the device is infected by malware. The instructions further cause the processor to, in response to the attempted accesses, (i) in response to one or more of the Internet-resource-identifier ratings, update one or more of the device ratings, and (ii) in response to one or more of the device ratings, update one or more of the Internet-resource-identifier ratings. The instructions further cause the processor to, subsequently, in response to the device ratings and Internet-resource-identifier ratings, ascertain that security of the computer network has been compromised, and generate an output in response thereto.

The present disclosure will be more fully understood from the following detailed description of embodiments thereof, taken together with the drawings, in which:

DETAILED DESCRIPTION OF EMBODIMENTS

Overview

Figure 1:
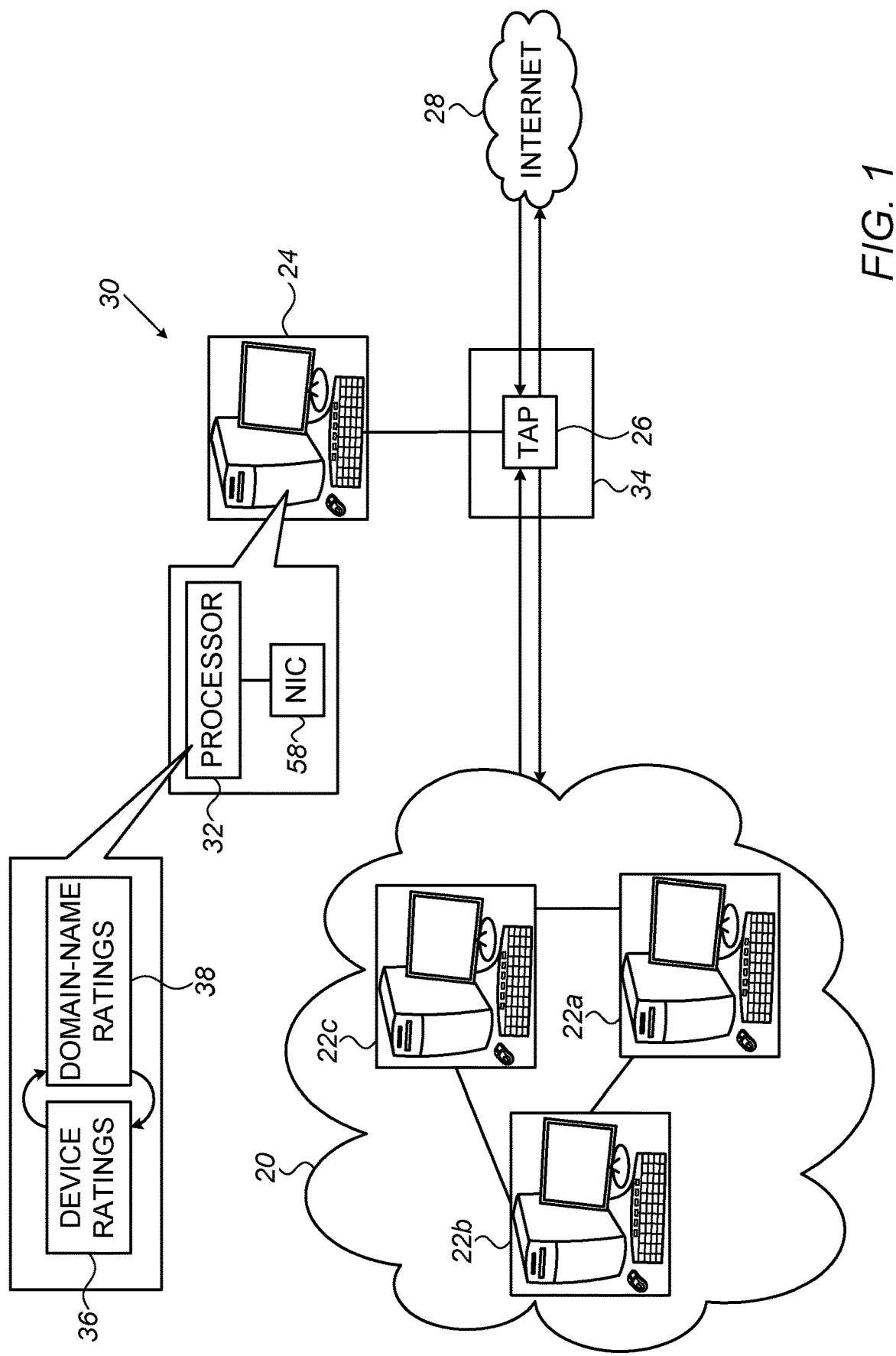
FIG. 1 is a schematic illustration of a system for monitoring security of a computer network, in accordance with some embodiments described herein.

A "bot" is a particular type of malware. Upon infecting a computer, a bot seeks instructions from a command-and-control server. Such instructions may include, for example, instructions to launch, together with other infected computers belonging to a "botnet," a denial-of-service (DoS) attack against a particular network resource. Some bots use a domain generation algorithm (DGA) to periodically generate a large number of domain names, the vast majority of which are unregistered. The command-and-control server, which knows the DGA that the bots are using, stores instructions, when required, at a small portion of the generated domain names, and the bots, by causing their hosts to attempt to access the generated domain names, find the instructions.

Embodiments described herein help identify the domain names that can potentially be used for delivering instructions to a bot, before at least some of the bots on a computer network succeed in obtaining the instructions.

In some embodiments, the system described herein maintains, for each device associated with a computer network, a device rating (i.e., a rating for the device), which reflects a likelihood that the device is infected by malware. The system described herein further maintains, for each of a plurality of domain names, a domain-name rating (i.e., a rating for the domain name), which reflects a likelihood that the domain name is malicious. (In the context of the present specification and claims, a "malicious" domain name is any domain name that has the potential of being used for malicious purposes. For example, a domain name may be malicious if it is generated by a bot using a DGA, since such a domain name may currently, or in the future, be used by a command-and-control server to deliver instructions to the bot.)

When a particular device attempts to access a particular domain name, the system may update the domain-name rating of the domain name in light of the device rating of the device, and/or update the device rating of the device in light of the domain-name rating. For example, if the device rating indicates that the device is relatively likely to be infected, the domain-name rating may be updated to indicate that the domain name is relatively likely to be malicious. Similarly, if the domain-name rating indicates that the domain name is relatively likely to be malicious, the device rating may be updated to indicate that the device is relatively likely to be infected.

Maintaining the device ratings and domain-name ratings as described above helps the system ascertain that the security of the computer network has been compromised. For example, upon updating a particular device rating, the processor may compare the device rating to a threshold. If the rating passes the threshold, the processor may ascertain that the device is relatively likely to be infected, and hence, that the security of the computer network has been compromised. In response to identifying an infected device, the system takes appropriate action, such as by reporting the infected device to a network administrator, and/or to anti-malware software. Alternatively or additionally, in response to identifying a malicious domain name, the system may inhibit, e.g., prevent, access to the domain name from the computer network.

Although the present description and figures relate mainly to an embodiment in which domain names are rated, it is noted that the scope of the present disclosure includes the rating of any other type of Internet-resource identifier, alternatively or additionally to the rating of domain names. For example, in some embodiments, the latter part of a domain name (e.g., the string "xyz.com" from the domain name "abc.xyz.com"), or an Internet Protocol (IP) address, may be assigned a rating. Such alternate Internet-resource-identifier ratings are updated and used as described below with respect to domain-name ratings.

System Description

Reference is initially made to FIG. 1, which is a schematic illustration of a system 30 for monitoring security of a computer network 20, in accordance with some embodiments described herein. Computer network 20 may comprise, for example, an internal network, such as an intranet belonging to a corporation. A plurality of devices, such as desktop computers, laptop computers, workstation computers, and/or any other types of computing devices, are associated with the computer network. For example, FIG. 1 shows three devices 22a, 22b, and 22c associated with the computer network.

Each of the devices attempts to access various domain names, by sending appropriate Domain Name System (DNS) queries from the computer network to an external network 28, such as the Internet, via a perimeter 34 of the network. Typically, system 30 comprises a server 24 comprising a processor 32, which, via a network tap 26 that is located in perimeter 34, and via a network interface, such as a network interface card (NIC) 58, monitors communication between computer network 20 and the Internet. Processor 32 identifies each attempted domain-name access originating from the network by identifying the relevant DNS query, and/or by identifying the relevant response to the DNS query. (In the context of the present specification and claims, an "attempted access" of a domain name refers to either a successful or unsuccessful attempt to access a resource represented by the domain name, by querying a domain name server (DNS).

As shown in FIG. 1, processor 32 maintains respective device ratings 36 for the devices belonging to computer network 20, and respective domain-name ratings 38 for a plurality of domain names. Each of the device ratings reflects a likelihood that the device to which the device rating belongs is infected by malware. For example, if the processor deems device 22b to be more or less likely than device 22a to be infected, the device rating of device 22b will be different from the device rating of device 22a. Likewise, each of the domain-name ratings reflects a likelihood that the domain name to which the domain-name rating belongs is malicious. As further described below, the processor updates the ratings according to a feedback loop, whereby the device ratings are updated in response to the domain-name ratings, and vice versa; this feedback loop is depicted in FIG. 1 by the arrows passing between device ratings 36 and domain-name ratings 38.

In response to each of the identified attempted accesses, the processor may update one or more of the domain-name ratings, and/or one or more of the device ratings, as appropriate. Several purely illustrative examples will now be provided. For these examples, it is assumed that a first rating is "worse" than a second rating if the first rating reflects a greater likelihood of infection or maliciousness than does the second rating. For example, if the processor deems device 22b to be more likely than device 22a to be infected, the device rating of device 22b will be worse than the device rating of device 22a. A rating is "bad" or "relatively bad" if it reflects a relatively high likelihood of infection or maliciousness. Typically, the ratings are numerical; for example, as assumed, simplistically, in the examples below, the ratings might be on a scale from 0 to 10, with 10 being the worst rating.

Example 1

The processor identifies that device 22a, which has a bad device rating (e.g., a "7"), attempts to access the domain name "45ycz9u8.com." In response thereto, the processor updates the domain-name rating of the domain name "45ycz9u8.com." For example, if the domain name "45ycz9u8.com" has not yet been rated, the processor may initialize the domain-name rating for "45ycz9u8.com" to a "5." Alternatively, if the domain name already has a rating of "5," the processor may raise the rating to "7" or "8."

Example 2

Subsequently to the attempted access by device 22a to the domain name "45ycz9u8.com," as described above in Example 1, device 22c attempts to access the same domain name, "45ycz9u8.com." Alternatively or additionally, the processor identifies that prior to device 22a attempting to access the domain name "45ycz9u8.com," device 22c attempted to access the same domain name, "45ycz9u8.com." In response to the attempted access by device 22c, and in response to the updated domain-name rating of "45ycz9u8.com," the processor updates the device rating of device 22c. For example, the processor may raise the rating of device 22c from a "0" to a "5."

Examples 1 and 2 together illustrate the feedback loop referred to above, in that the update to the device ratings in Example 2 is influenced by the update to the domain-name ratings in Example 1, which, in turn, is influenced by the device ratings.

Example 3

The processor identifies that device 22b attempts to access the domain name "i3r90zc.com," which has a bad domain-name rating (e.g., a "8"). In response thereto, the processor updates the device rating of device 22b. For example, if device 22b has a rating of "3," the processor may raise the rating to "6" or "7."

Example 4

Subsequently to the attempted access by device 22b to the domain name "i3r90zc.com," as described above in Example 3, device 22b attempts to access a different domain name, "9uy7tr5.com." Alternatively or additionally, the processor identifies that prior to device 22b attempting to access the domain name "i3r90zc.com," device 22b attempted to access "9uy7tr5.com." In response to the attempted access to "9uy7tr5.com," and in response to the updated device rating of device 22b, the processor updates the domain-name rating of domain "9uy7tr5.com." For example, if the domain name "9uy7tr5.com" has not yet been rated, the processor may initialize the domain-name rating for "9uy7tr5.com" to a "5." Alternatively, if the domain name already has a rating of "5," the processor may raise the rating to "7" or "8."

Examples 3 and 4 together also illustrate the feedback loop referred to above, in that the update to the domain-name ratings in Example 4 is influenced by the update to the device ratings in Example 3, which, in turn, is influenced by the domain-name ratings.

Example 5

The processor identifies that over a particular period of time (e.g., a 24-hour period), device 22a made fewer attempted accesses to domain names having bad domain-name ratings than did other devices in the network that have relatively bad device ratings. In response thereto, the processor may assign a good device rating to, or improve the device rating of, device 22a.

Example 6

The processor identifies that several devices having relatively good device ratings have attempted to access a particular domain name. In response thereto, the processor may assign a good domain-name rating to, or improve the domain-name rating of, the particular domain name, since it is more likely that the domain name is not malicious than that all of the devices that attempted to access the domain name are infected.

Examples 5 and 6 illustrate that the processor may sometimes improve a particular rating, in response to one or more other ratings. In Example 5, the processor improves the device rating of device 22a, in response to (i) the bad domain-name ratings of the accessed domain names, and (ii) the bad device ratings of the other devices. In Example 6, the processor improves the domain-name rating of the particular domain name, in response to the good device ratings of the devices that accessed the particular domain name.

It is noted that the processor typically differentiates between domain names that are known to be non-malicious, and domain names that are in doubt. For example, even if a device having a bad device rating attempts to access the domain name "cnn.com," the processor won't assign a bad rating, and in fact, may not even assign a rating at all, to "cnn.com," given that "cnn.com" is known to be non-malicious.

It is further noted that, typically, most of the domain names to which bad domain-name ratings are assigned do not currently have any malicious content, and, in fact, may not be registered at all. The rating of such domain names is nonetheless advantageous, in that it helps system 30 "preempt" the command-and-control server, by identifying malicious domain names before the malicious domain names are used to communicate instructions to at least some bots residing in the computer network. For example, in Example 1, the bad domain-name rating given to "45ycz9u8.com" may allow processor 32 to identify "45ycz9u8.com" as a malicious domain name, before the command-and-control server uses "45ycz9u8.com" to communicate instructions to a bot residing in network 20. Moreover, by identifying attempted accesses to such badly-rated domain names, the system may be able to identify those devices that have become infected, regardless of whether the domain names are registered or currently have malicious content.

Typically, the processor also updates the device ratings in response to identifying one or more failed Domain Name System (DNS) queries that originate from the devices. For example, if the processor identifies one or more failed Domain Name System (DNS) queries originating from device 22a, the processor may assign a relatively bad rating to device 22a, since the failed DNS queries may indicate that a bot on device 22a is seeking instructions from its command-and-control server. In some embodiments, the device rating is assigned based on the number and/or frequency of the failed queries.

The identification of failed DNS queries may be used to initially assign the device ratings, thus setting the feedback loop into motion. In other words, the initial assignment of the device ratings, based on the identification of the failed DNS queries, may allow some domain-name ratings to be assigned, thus allowing the device ratings to be updated, etc. Alternatively or additionally, the feedback loop may be set into motion by the initial assignment of some domain-name ratings, based on outside sources of information.

In general, processor 32 may be embodied as a single processor, or a cooperatively networked or clustered set of processors. Processor 32 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Figure 2:
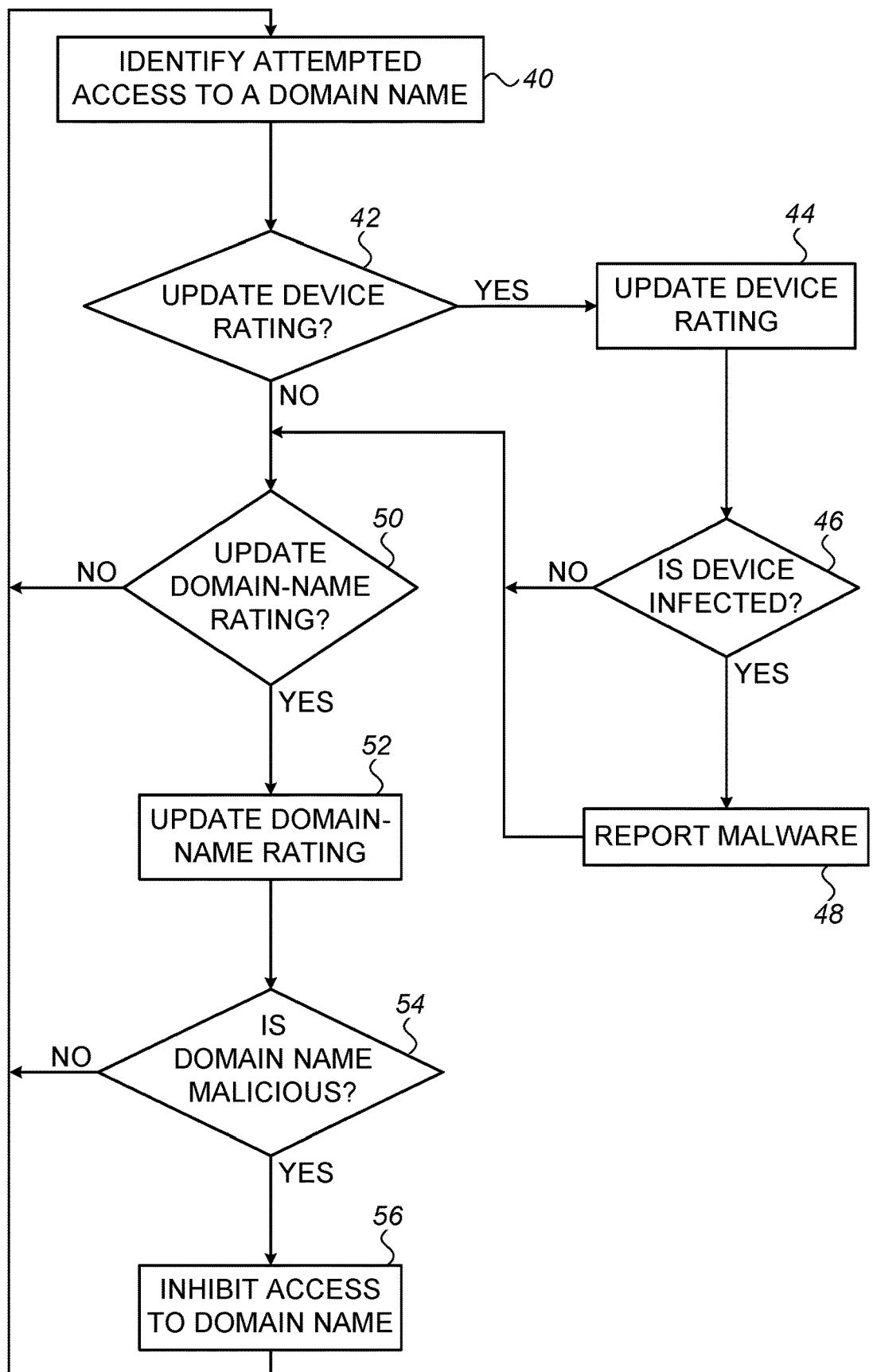
FIG. 2 is a flow diagram for a method for monitoring security of a computer network, in accordance with some embodiments described herein.

Reference is now made to FIG. 2, which is a flow diagram for a method for monitoring security of a computer network, in accordance with some embodiments described herein. In addition to showing several steps that were described above with reference to FIG. 1, FIG. 2 shows steps by which the processor ascertains that the security of the computer network has been compromised, as well as steps by which the processor generates an output, in response to ascertaining that the security of the computer network has been compromised.

At an identifying step 40, the processor identifies an attempted access to a domain name by one of the devices associated with the computer network, as described above. In response thereto, at a first decision step 42, the processor decides whether to update the device rating of the device. If the processor decides to update the device rating, the processor updates the device rating, at a device-rating-updating step 44. Subsequently, at a second decision step 46, the processor ascertains whether the security of the computer network has been compromised, in that the device is infected by malware. For example, the processor may ascertain whether the device is infected by malware, by comparing the device rating of the device to a threshold. (For example, using the simplistic rating system described above, a device may be considered to be infected if the device rating of the device is greater than "7.") If the processor ascertains that the device is infected by malware, the processor, at a reporting step 48, generates an output that reports the malware to anti-malware software, and/or generates any other appropriate output, such as an output that reports the infected device to the network administrator, or disconnects the infected device from the rest of the network.

Regardless of whether the processor updates the device rating of the device, the processor next decides, at a third decision step 50, whether to update the domain-name rating of the domain name that the device attempted to access. If the processor decides to update the domain-name rating, the processor updates the domain-name rating, at a domain-name-rating-updating step 52. Subsequently, at a fourth decision step 54, the processor ascertains whether the domain name is malicious, and hence, given that the device attempted to access the domain name, whether the security of the computer network has been compromised. For example, the processor may ascertain whether the domain name is malicious, by comparing the domain-name rating of the domain name to a threshold. If the processor ascertains that the domain name is malicious, the processor, at an inhibiting step 56, generates an output that inhibits access from the network to the domain name, and/or generates any other appropriate output, such as an output that reports the malicious domain name.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for monitoring security of a computer network, the method comprising:

identifying one or more attempted accesses from the computer network to respective Internet-resource identifiers in an external network by respective computing devices within the computer network,
  each of the Internet-resource identifiers having a respective Internet-resource-identifier rating that reflects a likelihood that one of a plurality of the Internet-resource identifiers is malicious, wherein the Internet-resource-identifier rating is an integer value, and
  each of the computing devices having a respective device rating that reflects a likelihood that the computing device is infected by malware, wherein the device rating is an integer value;
  updating the device rating of a respective one of the computing devices when the respective one of the computing devices attempts to access one of the plurality of Internet resources, wherein the updated device rating is based on the Internet-resource-identifier rating associated with the Internet resource identifier,
  updating the Internet-resource-identifier rating of a respective one of the Internet resource identifiers when a respective one the computing devices attempts to access the respective one of the Internet resource identifiers, wherein the updated Internet resource identifier rating is based on the device rating associated with the respective one of the computing devices, wherein the Internet-resource identifier rating of the respective one of the Internet resource identifiers is not assigned if the respective Internet-resource identifier is known to be non-malicious;
  updating one or more of the device ratings in response to one or more failed Domain Name System (DNS) queries, based on at least one of the following; (i) a number of the failed DNS queries, (ii) a frequency of the failed DNS queries, or (iii) both the number and the frequency of the failed DNS queries, originating from the computing devices to which the one or more device ratings, respectively, belong; and
  in response to at least one of the device ratings and Internet-resource-identifier ratings, ascertaining that the security of the computer network has been compromised, and generating an output in response thereto.

2. The method according to claim 1, wherein the Internet-resource identifiers include one or more domain names, each of the domain names having a respective domain-name rating that reflects a likelihood that the domain name is malicious.

3. The method according to claim 1, wherein ascertaining that the security of the computer network has been compromised comprises ascertaining that the security of the computer network has been compromised by ascertaining that (i) at least one of the Internet-resource identifiers is a malicious Internet-resource identifier, and (ii) at least one of the computing devices has attempted to access the malicious Internet-resource identifier.

4. The method according to claim 3, wherein the output inhibits access from the computer network to the malicious Internet-resource identifier.

5. The method according to claim 1, wherein ascertaining that the security of the computer network has been compromised comprises ascertaining that at least one of the computing devices is infected by malware.

6. The method according to claim 5, wherein the output reports the malware to anti-malware software.

7. The method according to claim 1,
wherein updating the one or more of the Internet-resource-identifier ratings comprises:
  ascertaining that in a first one of the attempted accesses, a first one of the computing devices attempted to access a particular one of the Internet-resource identifiers, and
  in response thereto, updating the Internet-resource-identifier rating of the particular one of the Internet-resource identifiers, and wherein updating the one or more of the device ratings comprises:
  ascertaining that in a second one of the attempted accesses, a second one of the computing devices attempted to access the particular one of the Internet-resource identifiers, and
  in response thereto, updating the device rating of the second one of the computing devices.

8. The method according to claim 7, wherein updating the device rating of the second one of the computing devices is further in response to the updated Internet-resource-identifier rating of the particular one of the Internet-resource identifiers, and wherein the second one of the attempted accesses is subsequent to the first one of the attempted accesses.

9. The method according to claim 7, wherein the second one of the attempted accesses is prior to the first one of the attempted accesses.

10. The method according to claim 1,
wherein updating the one or more of the device ratings comprises:
  ascertaining that in a first one of the attempted accesses, a particular one of the computing devices attempted to access a first one of the Internet-resource identifiers, and
  in response thereto, updating the device rating of the particular one of the computing devices, and
wherein updating the one or more of the Internet-resource-identifier ratings comprises:
  ascertaining that in a second one of the attempted accesses, the particular one of the computing devices attempted to access a second one of the Internet-resource identifiers, and
  in response thereto, and in response to the updated device rating of the particular one of the computing devices, updating the Internet-resource-identifier rating of the second one of the Internet-resource identifiers.

11. Apparatus for monitoring security of a computer network, the apparatus comprising:
  a network interface; and
  a hardware processor, configured to:
    via the network interface, identify one or more attempted accesses from the computer network to respective Internet-resource identifiers in an external network by respective computing devices comprised within the computer network,
      each of the Internet-resource identifiers having a respective Internet-resource-identifier rating that reflects a likelihood that one of a plurality of the Internet-resource identifiers is malicious, wherein the Internet-resource-identifier rating is an integer value, and
      each of the computing devices having a respective device rating that reflects a likelihood that the computing device is infected by malware, wherein the device rating is an integer value;

update the device rating of a respective one of the computing devices when the respective one of the computing devices attempts to access one of the plurality of Internet resource identifiers, wherein the updated device rating is based on the Internet-resource-identifier rating associated with the Internet resource identifier, and update the Internet-resource-identifier rating of a respective one of the Internet resources when a respective one the computing devices attempts to access the respective one of the Internet resource identifiers, wherein the updated Internet resource identifier rating is based on the device rating associated with the respective one of the computing devices, wherein the Internet-resource identifier rating of the respective one of the Internet resource identifiers is not assigned if the respective Internet-resource identifier is known to be non-malicious;

updating one or more of the device ratings in response to one or more failed Domain Name System (DNS) queries, based on at least one of the following; (i) a number of the failed DNS queries, (ii) a frequency of the failed DNS queries, or (iii) both the number and the frequency of the failed DNS queries, originating from the computing devices to which the one or more device ratings, respectively, belong; and subsequently, in response to at least one of the device ratings and Internet-resource-identifier ratings, ascertain that the security of the computer network has been compromised, and generate an output in response thereto.

12. The apparatus according to claim 11, wherein the processor is configured to ascertain that the security of the computer network has been compromised by ascertaining that (i) at least one of the Internet-resource identifiers is a malicious Internet-resource identifier, and (ii) at least one of the computing devices has attempted to access the malicious Internet-resource identifier.

13. The apparatus according to claim 12, wherein the output inhibits access from the computer network to the malicious Internet-resource identifier.

14. The apparatus according to claim 11, wherein the processor is configured to ascertain that the security of the computer network has been compromised by ascertaining that at least one of the computing devices is infected by malware.

15. The apparatus according to claim 14, wherein the output reports the malware to anti-malware software.

16. The apparatus according to claim 11,
wherein the processor is configured to update the one or more of the Internet-resource-identifier ratings by:
ascertaining that in a first one of the attempted accesses, a first one of the computing devices attempted to access a particular one of the Internet-resource identifiers, and
in response thereto, updating the Internet-resource-identifier rating of the particular one of the Internet-resource identifiers, and wherein the processor is configured to update the one or more of the device ratings by:
ascertaining that in a second one of the attempted accesses, a second one of the computing devices attempted to access the particular one of the Internet-resource identifiers, and
in response thereto, and in response to the updated Internet-resource-identifier rating of the particular one of the Internet-resource identifiers, updating the device rating of the second one of the computing devices.

17. The apparatus according to claim 11,
wherein the processor is configured to update the one or more of the device ratings by:
ascertaining that in a first one of the attempted accesses, a particular one of the computing devices attempted to access a first one of the Internet-resource identifiers, and
in response thereto, updating the device rating of the particular one of the computing devices, and
wherein the processor is configured to update the one or more of the Internet-resource-identifier ratings by:
ascertaining that in a second one of the attempted accesses, the particular one of the computing devices attempted to access a second one of the Internet-resource identifiers, and
in response thereto, and in response to the updated device rating of the particular one of the computing devices, updating the Internet-resource-identifier rating of the second one of the Internet-resource identifiers.

18. A computer software product comprising a tangible non-transitory computer-readable medium in which program instructions are stored, said program instructions, when read by a processor, cause the processor to:
identify one or more attempted accesses from a computer network to respective Internet-resource identifiers in an external network by respective computing devices comprised within the computer network,
each of the Internet-resource identifiers having a respective Internet-resource-identifier rating that reflects a likelihood that one of a plurality of the Internet-resource identifiers is malicious, wherein the Internet-resource-identifier rating is an integer value, and
each of the computing devices having a respective device rating that reflects a likelihood that the computing device is infected by malware, wherein the device rating is an integer value;
update the device rating of a respective one of the computing devices when the respective one of the computing devices attempts to access one of the plurality of Internet resource identifiers, wherein the updated device rating is based on the Internet-resource-identifier rating associated with the Internet resource identifier;
update the Internet-resource-identifier rating of a respective one of the Internet resource identifiers when a respective one the computing devices attempts to access the respective one of the Internet resource identifiers, wherein the updated Internet resource identifier rating is based on the device rating associated with the respective one of the computing devices, wherein the Internet-resource identifier rating of the respective one of the Internet resource identifiers is not assigned if the respective Internet-resource identifier is known to be non-malicious;
update one or more of the device ratings in response to one or more failed Domain Name System (DNS) queries, based on at least one of the following; (i) a number of the failed DNS queries, (ii) a frequency of the failed DNS queries, or (iii) both the number and the frequency of the failed DNS queries, originating from the computing devices to which the one or more device ratings, respectively, belong; and subsequently, in response to at least one of the device ratings and Internet-resource-identifier ratings, ascertain that security of the computer network has been compromised, and generate an output in response thereto.

19. The method according to claim 1, further comprising updating the device rating and the Internet-resource-identifier rating according to a feedback loop, whereby the device rating is updated in response to the Internet-resource-identifier rating, and whereby the Internet-resource-identifier rating is updated in response to the device rating.

20. The apparatus of claim 11, wherein the hardware processor comprises a programmed digital computing device comprising a central processing unit (CPU), random access memory (RAM), non-volatile secondary storage, and a network interface.

* * * * *